(12) United States Patent
Meng et al.

(10) Patent No.: US 12,218,821 B2
(45) Date of Patent: Feb. 4, 2025

(54) METHOD AND APPARATUS FOR INTER-DOMAIN DATA INTERACTION

(71) Applicant: ZTE Corporation, Shenzhen (CN)

(72) Inventors: Wei Meng, Shenzhen (CN); Liang Wang, Shenzhen (CN); Liya Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 567 days.

(21) Appl. No.: 17/612,659

(22) PCT Filed: Apr. 7, 2020

(86) PCT No.: PCT/CN2020/083540
§ 371 (c)(1),
(2) Date: Nov. 19, 2021

(87) PCT Pub. No.: WO2020/238418
PCT Pub. Date: Dec. 3, 2020

(65) Prior Publication Data
US 2022/0247667 A1    Aug. 4, 2022

(30) Foreign Application Priority Data
May 28, 2019    (CN) .......................... 201910452924.8

(51) Int. Cl.
*H04L 45/02* (2022.01)
*H04L 41/14* (2022.01)

(52) U.S. Cl.
CPC ............ *H04L 45/04* (2013.01); *H04L 41/145* (2013.01)

(58) Field of Classification Search
None
See application file for complete search history.

(56) References Cited

U.S. PATENT DOCUMENTS

| 8,856,863 | B2* | 10/2014 | Lang | ....................... G06F 21/57 |
| | | | | 713/153 |
| 9,729,576 | B2* | 8/2017 | Lang | ....................... G06F 21/57 |

(Continued)

FOREIGN PATENT DOCUMENTS

| CN | 102594606 A | 7/2012 |
| CN | 103200102 A | 7/2013 |

(Continued)

OTHER PUBLICATIONS

International Search Report for corresponding application PCT/CN2020/083540 filed Apr. 7, 2020; Mail date Jul. 8, 2020.

(Continued)

*Primary Examiner* — Faiyazkhan Ghafoerkhan
(74) *Attorney, Agent, or Firm* — CANTOR COLBURN LLP

(57) ABSTRACT

A method and system for inter-domain data interaction are provided. The method includes: a management apparatus configures, in respective domains, one or more models in a model group; a data collection apparatus encapsulates collected data in a designated message, and sends the designated message to a forwarder corresponding to a model, wherein the designated message carries indication information for indicating an address of the forwarder; and after processing the collected data, the forwarder processes the designated message, and sends the processed designated message to a next forwarder.

18 Claims, 5 Drawing Sheets

(56) References Cited

U.S. PATENT DOCUMENTS

| | | | |
|---|---|---|---|
| 10,116,704 B2* | 10/2018 | Lang | G06F 21/57 |
| 10,560,486 B2* | 2/2020 | Lang | H04L 63/1433 |
| 11,182,691 B1* | 11/2021 | Zhang | G06N 20/20 |
| 11,412,277 B2* | 8/2022 | Hennacy | H04N 21/44204 |
| 11,539,725 B2* | 12/2022 | Robbins | H04L 63/104 |
| 11,552,996 B2* | 1/2023 | Lang | H04L 63/20 |
| 11,777,812 B2* | 10/2023 | Mayyuri | G06N 3/084 |
| | | | 370/329 |
| 11,977,958 B2* | 5/2024 | Faulhaber, Jr. | G06N 20/10 |
| 2005/0243085 A1* | 11/2005 | Schechter | G06T 15/00 |
| | | | 345/419 |
| 2010/0211962 A1* | 8/2010 | Tessiore | G06F 9/545 |
| | | | 719/321 |
| 2010/0318975 A1* | 12/2010 | Gustafsson | G06F 8/314 |
| | | | 717/137 |
| 2011/0093916 A1* | 4/2011 | Lang | H04L 63/1433 |
| | | | 726/1 |
| 2014/0366085 A1* | 12/2014 | Lang | H04L 63/1433 |
| | | | 726/1 |
| 2015/0026027 A1* | 1/2015 | Priess | G06Q 10/04 |
| | | | 705/35 |
| 2017/0039576 A1* | 2/2017 | Gauthier | G06Q 30/0201 |
| 2017/0324779 A1* | 11/2017 | Lang | G06F 21/57 |
| 2018/0018590 A1* | 1/2018 | Szeto | G16H 50/20 |
| 2018/0219736 A1* | 8/2018 | Bugenhagen | H04W 4/24 |
| 2018/0219749 A1* | 8/2018 | Bugenhagen | H04Q 9/00 |
| 2018/0219959 A1* | 8/2018 | Bugenhagen | H04L 67/51 |
| 2019/0081985 A1* | 3/2019 | Lang | H04L 63/20 |
| 2019/0156244 A1* | 5/2019 | Faulhaber, Jr. | G06F 9/5072 |
| 2020/0014766 A1* | 1/2020 | Bugenhagen | H04L 41/5032 |
| 2020/0210895 A1* | 7/2020 | Han | G06N 3/044 |
| 2020/0304581 A1* | 9/2020 | Bugenhagen | H04L 41/18 |
| 2020/0336555 A1* | 10/2020 | Bugenhagen | H04L 41/0816 |
| 2020/0389533 A1* | 12/2020 | Bugenhagen | H04L 41/0816 |
| 2021/0195265 A1* | 6/2021 | Hennacy | H04N 21/23424 |
| 2021/0400116 A1* | 12/2021 | Bugenhagen | H04L 47/803 |
| 2022/0247667 A1* | 8/2022 | Meng | H04L 41/16 |

FOREIGN PATENT DOCUMENTS

| | | |
|---|---|---|
| CN | 106663033 A | 5/2017 |
| CN | 107963240 A | 4/2018 |
| CN | 109117998 A | 1/2019 |
| CN | 109257364 A | 1/2019 |
| CN | 109478055 A | 3/2019 |
| EP | 2863340 A2 | 4/2015 |

OTHER PUBLICATIONS

Anthony Hsu, "TonY: An Orchestrator for Distributed Machine Learning Jobs", ISENIX Conference on Operational Machine Learning, May 20, 2029, pp. 43-45, XP061032557.

European Search Report for corresponding application EP20813717; Report dated Jun. 22, 2022.

* cited by examiner

METHOD AND APPARATUS FOR INTER-DOMAIN DATA INTERACTION

CROSS REFERENCE

This application is a National Stage Filing of the PCT International Application No. PCT/CN2020/083540 filed on Apr. 7, 2020, which claims priority to Chinese Application No. 201910452924.8 filed on May 28, 2019, the entirety of which is herein incorporated by reference.

TECHNICAL FIELD

The present disclosure relates to the field of communications, and in particular to a method and a system for inter-domain data interaction.

BACKGROUND

In today's society, it becomes easier and easier to create a deep learning model based on artificial intelligence technology, and it is no longer difficult for data scientists and developers to create a complex model in a test environment. For a simple scenario, e.g., a scenario in which the number of models is small and the requirements on performance are not high, a group of models may be run in a same micro service framework or a same physical, hardware, or software environment.

However, with the wide application of artificial intelligence, artificial intelligence is expanded from simple application scenarios of voice recognition, image recognition and character recognition to complex scenarios such as industrial control and operation management. Different scenarios have different requirements for models and matching environments, for example, different requirements for computing power, network delay, deduction time, security, etc., and thus it becomes very difficult to achieve large-scale deployment of artificial intelligence models.

In a complex scenario, an artificial intelligence-based application usually needs to be completed based on a group of models, but these models may be deployed in various corners of the scenario in a distributed manner. For example, for automatic operation and maintenance management of a network, some models having high requirements for time delay are suitable for being deployed at a network edge, and other models having high requirements for computing power and low requirements for time delay are suitable for being deployed at a network core. Some applications can be completed only by co-working of models deployed on the network edge and models deployed on the network core. The network edge and the network core are usually not located in the same domain, and in such a scenario, a calculation result of models deployed on the network edge needs to be transmitted to models on the network core for further calculation, which brings complexity of networking and planning. More importantly, currently there is no technology capable of transmitting a calculation result between different domains.

SUMMARY

The embodiments of the present disclosure provide a method and a system for inter-domain data interaction, which can solve the problem in the related art that it is difficult to achieve large-scale deployment of artificial intelligence models due to the fact that different models in a model group have different requirements for matching environments and are located in different domains.

According to some embodiments of the present disclosure, a method for inter-domain data interaction is provided, including: a management apparatus configures, in respective domains, one or more models in a model group; a data collection apparatus encapsulates collected data in a designated message, and sends the designated message to a forwarder corresponding to a model, wherein the designated message carries indication information for indicating an address of the forwarder; and after processing the collected data, the forwarder processes the designated message, and sends the processed designated message to a next forwarder.

According to some other embodiments of the present disclosure, an apparatus for inter-domain data interaction is provided, including: a management module, located in a management apparatus and configured to configure, in respective domains, one or more models in a model group; a collection module, located in a data collection apparatus and configured to encapsulate collected data in a designated message, and send the designated message to a forwarder corresponding to a model, wherein the designated message carries indication information for indicating an address of the forwarder; and a processing module, located in the forwarder and configured to process the designated message after processing the collected data, and send the processed designated message to a next forwarder.

According to still some other embodiments of the present disclosure, a storage medium is further provided, the storage medium stores a computer program, wherein the computer program is configured to execute, when running, the operations in any one of the described method embodiments.

According to still some other embodiments of the present disclosure, an electronic apparatus is further provided, including a memory and a processor; the memory is configured to store a computer program, and the processor is configured to run the computer program so as to execute the operations in any one of the described method embodiments.

By means of the embodiments of the present disclosure, forwarders are provided to perform interaction between models, and the forwarders can perform processing on a model from a previous node, while performing adaptation to processing of a next node; therefore, the problem that it is difficult to achieve large-scale deployment of artificial intelligence models due to the fact that different models in a model group have different requirements for matching environments and are located in different domains can be solved, thereby achieving the effects of transmitting a calculation result of models between domains, performing distributed deployment on a group of models, and enabling the models to work cooperatively.

BRIEF DESCRIPTION OF THE DRAWINGS

The drawings illustrated herein are used for providing further understanding of the present disclosure and constitute a part of some embodiments of the present disclosure, and the illustrative embodiments of the present disclosure and illustrations thereof are used for explaining the present disclosure, rather than constitute inappropriate limitation on the present disclosure. In the drawings.

DETAILED DESCRIPTION

Hereinafter, the present disclosure is described in detail with reference to the drawings and in conjunction with the embodiments. It is to be noted that embodiments in the present disclosure and features in the embodiments may be combined with one another without conflicts.

It is to be noted that the terms "first", "second", etc. in the description, claims and drawings of the present disclosure are used to distinguish similar objects, and are not used to describe a specific sequence or a precedence order.

Embodiment 1

Figure 1:
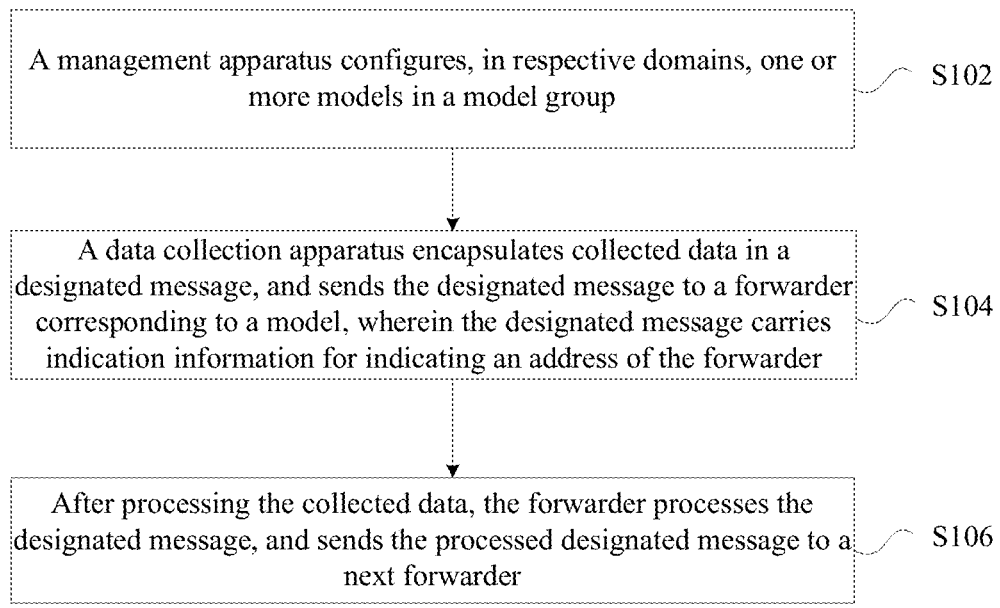
FIG. 1 is a flowchart of a method for inter-domain data interaction according to embodiments of the present disclosure.

This embodiment provides a method for inter-domain data interaction. FIG. 1 is a flowchart of a method for inter-domain data interaction according to embodiments of the present disclosure. As shown in FIG. 1, the process includes the following operations S102 to S106.

In operation S102, a management apparatus configures, in respective domains, one or more models in a model group.

In operation S104, a data collection apparatus encapsulates collected data in a designated message, and sends the designated message to a forwarder corresponding to a model, wherein the designated message carries indication information for indicating an address of the forwarder.

In operation S106, after processing the collected data, the forwarder processes the designated message, and sends the processed designated message to a next forwarder.

It should be noted that in this embodiment and subsequent embodiments, a domain refers to a range with the same system and hardware. For example, in the field of processors, a domain may represent a core in a processor. Also for example, in the field of communications, a domain may represent a terminal in communication with a base station.

Moreover, there are hierarchies among domains. For example, in the operation management of a company, a bottom-layer domain represents basic-level employees, a middle-layer domain represents middle-level leaders, and a top-layer domain represents the company. The upper-layer domain may include one or more lower-layer domains. For example, group A, group B, group C, or middle-level leader I, middle-level leader II, etc. In addition, domains at different hierarchies are associated with one another. For example, group member—group leader—manager The model refers to a system which implements functions such as specific analysis and prediction and is obtained by learning from existing data or experience by means of methods such as machine learning and deep learning. For example, taking the management of a company as an example, the model may include a model predicting an employee's annual attendance condition, a model predicting an employee's annual performance, and a model predicting company's annual income. Moreover, models are also associated with one another. For example, a prediction result of a model corresponding to predicting an employee's annual attendance condition of basic-level employees in the bottom-layer domain is used as an input of a model predicting a middle-level leader's annual performance. In addition, a prediction result of a model predicting an employee's annual performance in middle-level leaders in the middle-layer domain is used as an input of a model predicting company's annual income.

The models inside a domain may complete information interaction by means of an internal mechanism (for example, an inter-process message, a shared memory, etc.).

In some exemplary implementations, the indication information may further include: the number of models that have not completed data processing.

In some exemplary implementations, in a case where the number of models that have not completed data processing is 0, the method may further include: the forwarder sends the processed designated message to a policy server.

Obviously, the number of models that have not completed data processing being 0 means that all the models have completed data processing. Therefore, the policy server is configured to provide a corresponding adjustment policy for the entire system according to a final processing result. For example, taking the management of a company as an example, after receiving the company's annual income, the policy server may make a policy of increasing annual income for the company.

In some exemplary implementations, the operation that the management apparatus configures, in the respective domains, the one or more models in the model group includes: the management apparatus creates management entries for the model group, wherein the management entries at least include: identifier information of the model group, model group information, address information of the data collection apparatus and address information of a policy server; and the management apparatus configures, in the respective designated domains, the one or more models according to the management entries.

In some exemplary implementations, the identifier information of the model group is used to identify the type of the model group, for example, whether the model group is applied in a management process of a company, or a flood season situation of a river in summer, or traffic management of a network device.

In some exemplary implementations, the model group information at least includes one of: identifier information of the one or more models, an arrangement order of the one or more models, information of one or more domains where the one or more models are located, and address information of one or more forwarders.

In some exemplary implementations, the management apparatus sends the model group information to the data collection apparatus and each of the one or more forwarders.

In addition, it also should be noted that the management apparatus configures, in respective domains, one or more models in a model group, and a data collection apparatus for receiving data input may also be provided.

In some exemplary implementations, the operation that the data collection apparatus encapsulates the collected data in the designated message, and sends the designated message to the forwarder corresponding to the model includes: the data collection apparatus encapsulates the indication information in a message header of the designated message.

Specifically, after data in a data stream is inputted to the data collection apparatus, the data collection apparatus may take the data as a load and configure the data in the message.

In some exemplary implementations, the operation that the data collection apparatus encapsulates the collected data in the designated message, and sends the designated message to the forwarder corresponding to the model includes: the data collection apparatus encapsulates the indication information in a message header of the designated message.

In some exemplary implementations, the indication information may further include at least one of: identifier information of the model group; and metadata, wherein the metadata is used to indicate custom fields for inter-model interaction.

Figure 2:
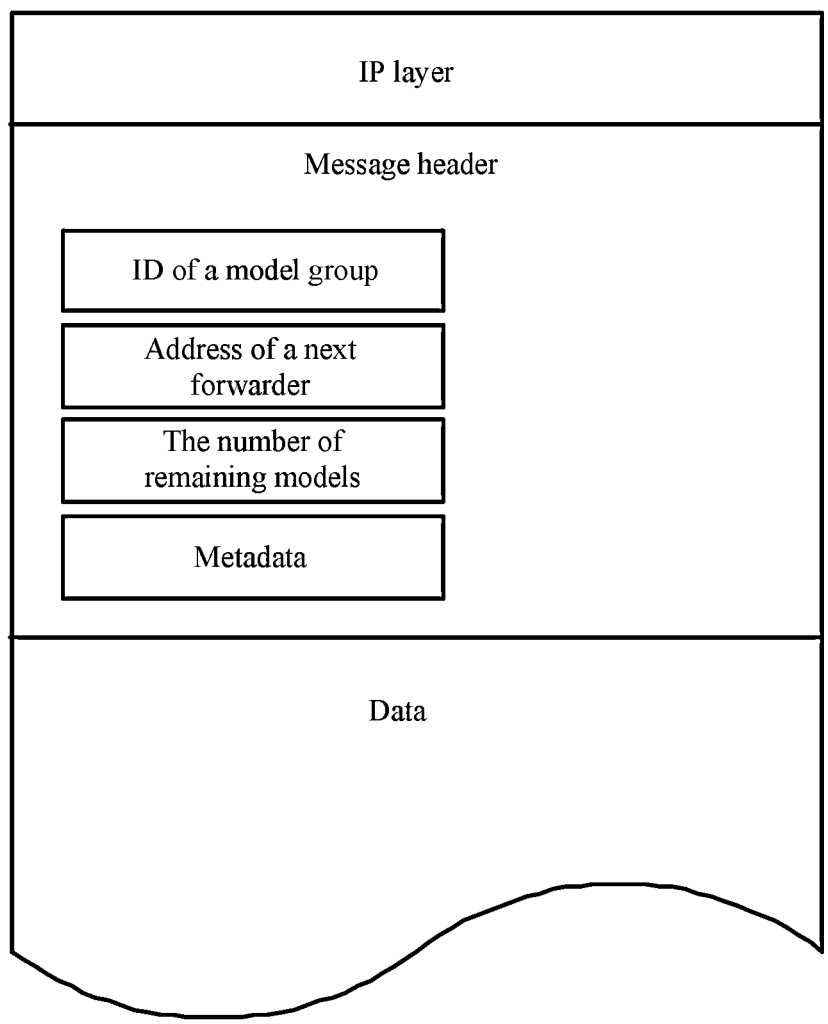
FIG. 2 is a schematic structural diagram of a message according to embodiments of the present disclosure.

FIG. 2 is a schematic structural diagram of a message according to embodiments of the present disclosure. As shown in FIG. 2, in the message, data serving as a load is provided in a lower position, and a message header is configured above the data. In the message header, identifier information of a model group, address information of a next forwarder, the number of remaining models that have not completed data processing, and metadata are sequentially provided.

In some exemplary implementations, the operation that the forwarder processes the designated message includes: the forwarder inputs the collected data to a corresponding model for calculation; the forwarder updates data in the designated message according to a calculation result; and the forwarder updates the indication information.

The operation that the forwarder updates the indication information includes: the forwarder determines an address of the next forwarder according to the arrangement order of the one or more models; and the forwarder subtracts 1 from the number of models that have not completed data processing.

In some exemplary implementations, the operation that the forwarder updates the indication information includes: the forwarder updates the metadata.

Taking the management of a company as an example, a basic-level employee's current-year sleeping condition is used as collected data, and after receiving the collected data, a forwarder corresponding to a model predicting an employee's annual attendance condition in the bottom-layer domain will complete calculation of the employee's annual attendance condition, so as to obtain an employee's annual attendance rate. The basic-level employee's current-year sleeping condition cannot be used for calculating a middle-level leader's annual performance, and thus the forwarder corresponding to the model predicting an employee's annual attendance condition will replace the collected data with the employee's annual attendance rate. Moreover, according to a hierarchical order, i.e., basic-level employees—middle-level leaders—company, the forwarder corresponding to the model predicting an employee's annual attendance condition will modify the address information of the forwarder to the address of a forwarder corresponding to a model predicting an employee's annual performance. In addition, as a prediction value of the basic-level employee's annual attendance rate has been acquired, the number of models that have not completed data processing is decreased from 3 to 2.

From the description of the described embodiments, a person having ordinary skill in the art would have been able to clearly understand that the method in the described embodiments may be implemented by using software and necessary general hardware platforms, and of course may also be implemented using hardware, but in many cases, the former is a better embodiment. Based on such understanding, the portion of the technical solution of the present disclosure that contributes in essence or to the prior art may be embodied in the form of a software product. The computer software product is stored in a storage medium (such as an ROM/RAM, a magnetic disk and an optical disc), and includes a number of instructions for enabling a terminal device (which may be a mobile phone, a computer, a server, or a network device, etc.) to perform the methods described in various embodiments of the present disclosure.

Embodiment 2

The present embodiment provides an apparatus for inter-domain data interaction, the apparatus is used to implement the foregoing embodiments and preferred embodiments, and what has been described will not be repeated again. As used below, the term "module" may implement a combination of software and/or hardware of predetermined functions. Although the apparatus described in the following embodiments is preferably implemented in software, the implementation in hardware or a combination of software and hardware is also possible and conceived.

Figure 3:
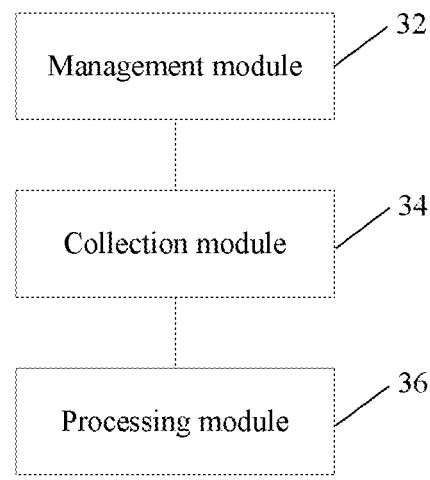
FIG. 3 is a structural block diagram of an apparatus for inter-domain data interaction according to embodiments of the present disclosure.

FIG. 3 is a structural block diagram of an apparatus for inter-domain data interaction according to embodiments of the present disclosure. As shown in FIG. 3, the apparatus includes:

a management module 32, located in a management apparatus and configured to configure, in respective domains, one or more models in a model group;

a collection module 34, located in a data collection apparatus and configured to encapsulate collected data in a designated message, and send the designated message to a forwarder corresponding to a model, wherein the designated message carries indication information for indicating an address of the forwarder; and a processing module 36, located in the forwarder and configured to process the designated message after processing the collected data, and send the processed designated message to a next forwarder.

Figure 4:
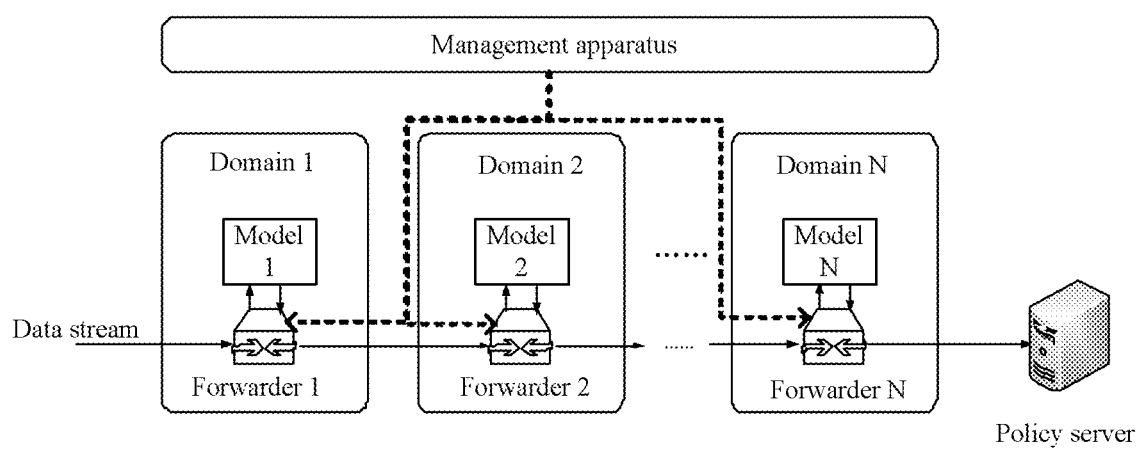
FIG. 4 is a schematic diagram of an inter-domain data interaction model according to embodiments of the present disclosure.

FIG. 4 is a schematic diagram of an inter-domain data interaction model according to embodiments of the present disclosure, and is used to describe a connection relationship of the described apparatus for inter-domain data interaction.

It should be noted that the described modules may be implemented by software or hardware. The latter may be implemented in the following manner, but is not limited thereto. All the described modules are located in a same processor; or, all the described modules are located in different processors in any arbitrary combination manner.

To facilitate better understanding of the technical solutions described in the above embodiments, the following two scenarios are further provided in this embodiment.

Figure 5:
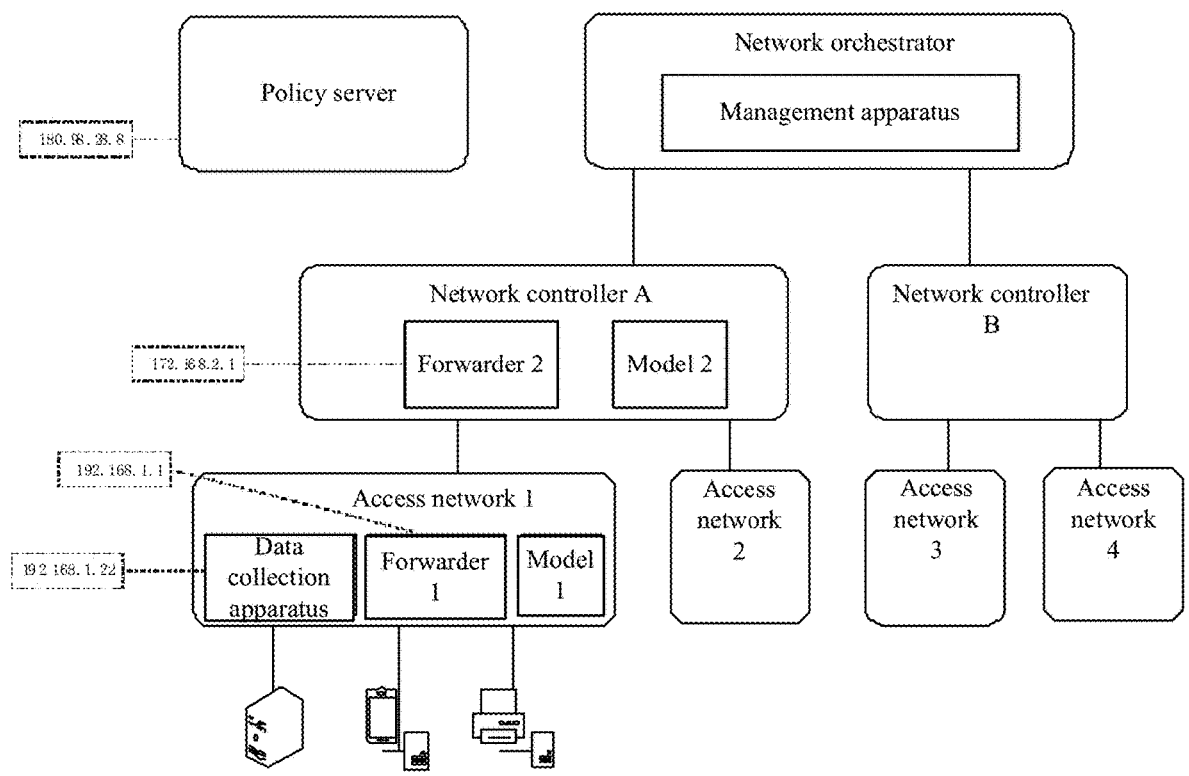
FIG. 5 is a schematic diagram of intelligent operation and maintenance of a 5G network according to embodiments of the present disclosure.

Scenario 1:

FIG. 5 is a schematic diagram of intelligent operation and maintenance of a 5G network according to embodiments of the present disclosure. As shown in FIG. 5, the scenario is described below in detail.

In the scenario, model 1 is used to predict current network traffic in 2 hours, and model 2 is used to perform calculation and deduction based on the prediction result of the model 1 and information about the number of users on a control plane, so as to provide suggestion on whether a network node needs single-board expansion, and to generate a relevant policy.

This scenario has no strong requirement on real time ability, and requirements are met if a policy after two hours can be predicted within five minutes.

Traffic information exists at a network edge, i.e., at an access network; and user information exists in a control plane, i.e., in a network controller. Therefore, the model 1 is suitable for being deployed at the access network, and the model 2 is suitable for being deployed at the network controller.

In operation 1, a management apparatus creates entries of a model group with an ID of 100, wherein the entries include the following information: a sequence of models is model 1→model 2; the number of models in the model group is 2; the ID of the model 1 is 1008, the domain to which the model 1 belongs is an access network 1, and the IP address of a forwarder to which the model 1 belongs is 192.168.1.1; the ID of the model 2 is 2090, the domain to which the model 2 belongs is a network controller A, the IP address of a forwarder to which the model 2 belongs is 172.168.2.1; the IP address of a data collection apparatus is 192.168.1.22; and the IP address of a policy server designated by a user is 180.98.28.8.

In operation 2, the management apparatus sends information of the described entries to a forwarder 1, a forwarder 2 and the data collection apparatus; and the forwarder 1, the forwarder 2 and the data collection apparatus store relevant information.

In operation 3, after receiving a data stream, the data collection apparatus sets the number of remaining models as 2, sets the address of a next forwarder as an IP address 192.168.1.1, sets the metadata as zero, encapsulates the described information before the data stream, and sends the message to the forwarder 1 of 192.168.1.1 through an IP protocol.

In operation 4, after receiving the message, the forwarder 1 checks that the number of remaining models is 2, which means that the message is valid; and the forwarder 1 decapsulates the message, sends the data stream to the model 1 for performing traffic prediction processing.

In operation 5, upon calculation, the model 1 sends a result to the forwarder 1.

In operation 6, after receiving the calculation result, the forwarder 1 subtracts 1 from the number of remaining models, sets the address of a next forwarder as an IP address 172.168.2.1, sets metadata as a feature value representing the number of users, encapsulates the described information before the calculation result, and sends the message to the forwarder 2 of 172.168.2.1 through the IP protocol.

In operation 7, after receiving the message, the forwarder 2 decapsulates the message, checks that the number of remaining models is 1, which means that the message is valid, and checks that the metadata is the feature value representing the number of users, and therefore session data carrying the number of users, together with the calculation result of the model 1, is sent to the model 2 for expansion deduction.

In operation 8, the model 2 sends the deduction result to the forwarder 2.

In operation 9, after receiving the calculation result, the forwarder 2 subtracts 1 from the number of remaining models, and finds that the number of remaining models is 0, and therefore the forwarder 2 sends the deduction result to a server 180.98.28.8 designated by the user through the IP protocol.

Figure 6:
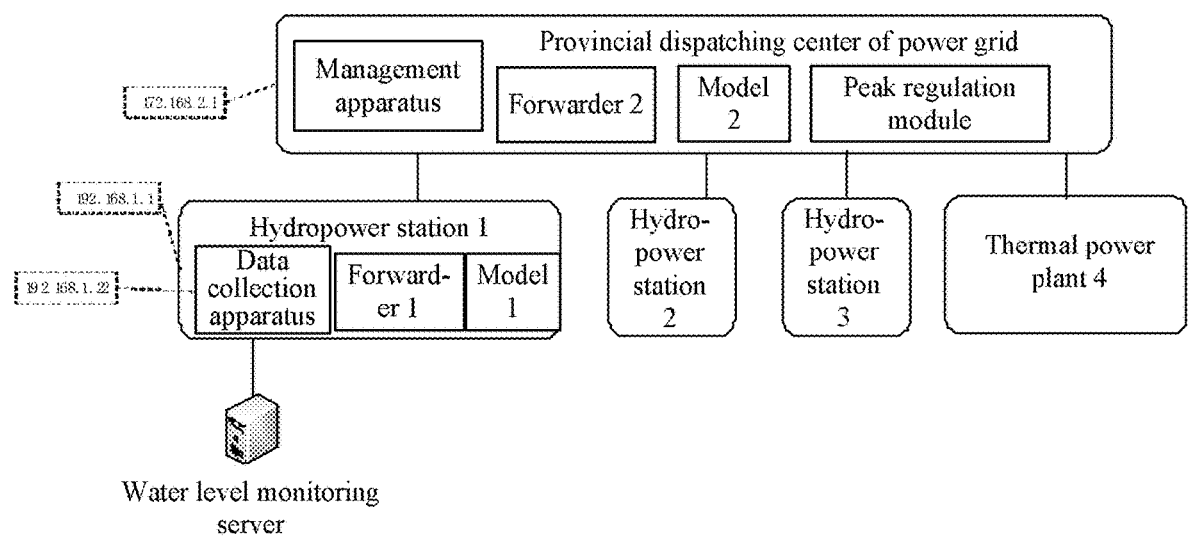
FIG. 6 is a schematic diagram of intelligent peak regulation of a power grid according to embodiments of the present disclosure.

Scenario 2:

FIG. 6 is a schematic diagram of intelligent peak regulation of a power grid according to embodiments of the present disclosure. As shown in FIG. 6, the scenario is described below in detail.

As electrical loads are not uniform, overloading usually occurs in a power grid at peak electricity usage periods. In this case, it is necessary to put generator sets outside normal operation into use to meet the demand. These generator sets are called peak regulation sets. The requirements of the peak regulation sets are being convenient and quick to start and stop, and easy synchronization regulation during grid connection.

Due to good regulation characteristics and convenient power-on and power-off performances, hydroelectric generating sets play an important role in frequency modulation, peak regulation and emergency reserve processes of a power grid. The rapid sensitivity of load increasing and decreasing of the hydroelectric generating sets facilitates meeting high standard requirements of power grid peak regulation and emergency support for grid capacity. Moreover, the grid purchase price of most hydroelectric generating sets is lower than that of thermal energy sources and other energy sources, and thus the cost of peak regulation thereof is relatively cheap, and preferential arrangement should be given thereto in a case where the peak regulation capacity is abundant. In addition, during a flood season period in which peak regulation is relatively insufficient, hydropower stations with poor regulation capability should generate power more while regulating peak less, so as to make full use of seasonal electric energy thereof, reduce electricity purchasing cost of a power grid, and reduce coal firing in thermal power plants and atmospheric pollution.

However, the hydroelectric generating sets bear a lot of peak regulation tasks, causing too much water in a flood season, and thus the operating of electric power systems in a low valley period requires hydroelectric peak regulation to discard water, causing a large amount of economic losses, the annual losses being about a trillion Yuan.

By using artificial intelligence to predict peak and valley loads of a power grid, and to predict rainfall of hydropower plants and water reservoir level, the losses caused by water discarding due to hydroelectric peak regulation can be effectively reduced.

As shown in the FIG. 6, a model 1 is used to predict water level of a hydropower station 1 in 24 hours, and a model 2 is used to determine dispatching of the hydropower station 1 based on the prediction of a load of a power grid in future 24 hours in combination with the result of the model 1.

In operation 1, a management apparatus creates entries of a model group with an ID of 200, wherein the entries include the following information: a sequence of the models is model 1→model 2; the number of models in the model group is 2; the ID of the model 1 is 2008, the domain to which the model 1 belongs is the hydropower station 1, and the IP address of a forwarder to which the model 1 belongs is 192.168.1.1; the ID of the model 2 is 3001, the domain to which the model 2 belongs is a provincial dispatching center, and the IP address of a forwarder to which the model 2 belongs is 172.168.2.1; and the IP address of a data collection apparatus is 192.168.1.22.

In operation 2, the management apparatus sends information of the described entries to a forwarder 1, a forwarder 2 and the data collection apparatus; and the forwarder 1, the forwarder 2 and the data collection apparatus store relevant information.

In operation 3, a water level monitoring server sends real-time data to the data collection apparatus with the IP address of 192.168.1.22.

In operation 4, after receiving a data stream, the data collection apparatus sets the number of remaining models as 2, sets the address of a next forwarder as an IP address 192.168.1.1, sets metadata as zero, encapsulates the described information before the data stream, and sends the message to the forwarder 1 of 192.168.1.1 through an IP protocol.

In operation 5, after receiving the message, the forwarder 1 checks that the number of remaining models is 2, which means that the message is valid; and the forwarder 1 decapsulates the message, sends the data stream to the model 1 for performing water level prediction processing.

In operation 6, prediction is performed on a water reservoir level of the hydropower station 1 of the next 24 hours based on a current water level, an upstream water level and weather forecast; and the prediction result is that within 24 hours, the water reservoir level will reach a threshold, and if grid connection is not performed for power generation, water will be discarded, which causes losses.

In operation 7, the model 1 sends the prediction result of operation 6 to the forwarder 1.

In operation 8, after receiving a calculation result, the forwarder 1 subtracts 1 from the number of remaining models, sets the address of a next forwarder as an IP address 172.168.2.1, and sends the message to the forwarder 2 of 172.168.2.1 through the IP protocol.

In operation 9, after receiving the message, the forwarder 2 decapsulates the message, checks that the number of remaining models is 1, which means that the message is valid, and sends the message and the calculation result of the model 1 to the model 2 for peak regulation deduction.

In operation 10, the model 2 sends a policy according to an electric quantity load curve in future 24 hours and the prediction result of the model 1: power off 4 generator sets in the thermal power plant after 10 hours, and power on 1 generator set in the hydropower station as a base load, and the hydropower station 2 and the hydropower station 3 serve as peak regulation power plants, so as to reduce losses caused by water discarding of the hydropower station 1.

In operation 11, the model 2 sends the result to the forwarder 2.

In operation 12, after receiving the calculation result of the model 2, the forwarder 2 subtracts 1 from the number of remaining models, and finds that the number of remaining models is 0, and therefore, the forwarder 2 sends the deduction result to a peak regulation module through the IP protocol, for managing the power grid.

Embodiment 3

The embodiment of the present disclosure provides a storage medium, the storage medium stores a computer program, wherein the computer program is configured to execute, when running, the operations in any one of the described method embodiments.

In some exemplary implementations of this embodiment, the storage medium may be configured to store a computer program for executing the following operations S1 to S3.

In operation S 1, a management apparatus configures, in respective domains, one or more models in a model group.

In operation S2, a data acquisition apparatus encapsulates collected data in a designated message, and sends the designated message to a forwarder corresponding to a model, wherein the designated message carries indication information for indicating an address of the forwarder and the number of models that have not completed data processing.

In operation S3, after processing the collected data, the forwarder processes the designated message, and sends the processed designated message to a next forwarder.

In some exemplary implementations of this embodiment, the storage medium may include, but is not limited to, any medium that can store a computer program, such as a USB flash drive, a Read-Only Memory (ROM for short), a Random Access Memory (RAM for short), a removable hard disk, a magnetic disk, or an optical disc.

The embodiment of the present disclosure provides an electronic apparatus, including a memory and a processor; the memory is configured to store a computer program, and the processor is configured to run the computer program, so as to execute the operations in any one of the method embodiments.

In some exemplary implementations of the embodiment, the electronic apparatus may further include a transmission device and an input/output device, wherein the transmission device is connected to the processor, and the input/output device is connected to the processor.

In some exemplary implementations of this embodiment, the processor may be configured to execute the following operations S1 to S3 by means of the computer program.

In operation S1, a management apparatus configures, in respective domains, one or more models in a model group.

In operation S2, a data acquisition apparatus encapsulates collected data in a designated message, and sends the designated message to a forwarder corresponding to a model, wherein the designated message carries indication information for indicating an address of the forwarder and the number of models that have not completed data processing.

In operation S3, after processing the collected data, the forwarder processes the designated message, and sends the processed designated message to a next forwarder.

In some exemplary implementations, for specific examples in the present embodiment, reference can be made to the examples described in the described embodiments and exemplary embodiments, and thus they will not be repeated again in the present embodiment.

It is apparent that a person having ordinary skill in the art shall understand that all the modules or operations in the present disclosure may be implemented by using a general calculation apparatus, may be centralized on a single calculation apparatus or may be distributed on a network composed of multiple calculation apparatuses. In some exemplary implementations, they may be implemented by using executable program codes of the calculation apparatuses. Thus, they may be stored in a storage apparatus and executed by the calculation apparatuses, and in some cases, the shown or described operations may be executed in a sequence different from that shown herein, or they are manufactured into integrated circuit modules, or multiple modules or operations therein are manufactured into a single integrated circuit module. Thus, the present disclosure is not limited to any specific hardware and software combinations.

The content above only relates to preferred embodiments of the present disclosure, and is not intended to limit the present disclosure. For a person having ordinary skill in the art, the present disclosure may have various modifications and changes. Any modifications, equivalent replacements, improvements, etc. made within the principle of the present disclosure shall all fall within the scope of protection of the present disclosure.

INDUSTRIAL APPLICABILITY

By means of the embodiments of present disclosure, forwarders are provided to perform interaction between models, and the forwarders can perform processing on a model from a previous node, while performing adaptation to processing of a next node; therefore, the problem that it is difficult to achieve large-scale deployment of artificial intelligence models due to the fact that different models in a model group have different requirements for matching environments and are located in different domains can be solved, thereby achieving the effects of transmitting a calculation result of models between domains, performing distributed deployment on a group of models, and enabling the models to work cooperatively.

What is claimed is:

1. A method for inter-domain data interaction, comprising:
configuring, in respective domains by a management apparatus, one or more models in a model group;
encapsulating, by a data collection apparatus, collected data in a designated message, and sending, by the data collection apparatus, the designated message to a forwarder corresponding to a model, wherein the designated message carries indication information for indicating an address of the forwarder; and
after processing the collected data, processing, by the forwarder, the designated message, and sending, by the forwarder, the processed designated message to a next forwarder;
wherein the indication information further comprises: a number of models that have not completed data processing; and in response to the number of models that have not completed data processing being 0, the method further comprises: sending, by the forwarder, the processed designated message to a policy server.

2. The method according to claim 1, wherein configuring, in the respective domains by the management apparatus, the one or more models in the model group comprises:
creating, by the management apparatus, management entries for the model group, wherein the management entries at least comprise: identifier information of the model group, model group information, address information of the data collection apparatus and address information of a policy server; and
configuring, in respective designated domains by the management apparatus, the one or more models according to the management entries.

3. The method according to claim 2, wherein the model group information at least comprises one of: identifier information of the one or more models, an arrangement order of the one or more models, information of one or more domains where the one or more models are located, and address information of one or more forwarders.

4. The method according to claim 3, wherein encapsulating, by the data collection apparatus, the collected data in the designated message, and sending the designated message to the forwarder corresponding to the model comprises:
encapsulating, by the data collection apparatus, the indication information in a message header of the designated message.

5. The method according to claim 4, wherein the indication information further comprises at least one of:
identifier information of the model group; and
metadata, wherein the metadata is used to indicate custom fields for inter-model interaction.

6. The method according to claim 5, wherein processing, by the forwarder, the designated message comprises:
inputting, by the forwarder, the collected data to a corresponding model for calculation;
updating, by the forwarder, data in the designated message according to a calculation result; and
updating, by the forwarder, the indication information.

7. The method according to claim 6, wherein updating, by the forwarder, the indication information comprises:
determining, by the forwarder, an address of the next forwarder according to the arrangement order of the one or more models; and
subtracting, by the forwarder, 1 from the number of models that have not completed data processing.

8. The method according to claim 6, wherein updating, by the forwarder, the indication information further comprises:
updating, by the forwarder, the metadata.

9. The method according to claim 2, wherein
the management apparatus sends the model group information to the data collection apparatus and each of the one or more forwarders.

10. The method according to claim 2, wherein the identifier information of the model group is used to identify a type of the model group.

11. An electronic apparatus, comprising a memory and a processor, wherein the memory is configured to store a computer program, and the processor is configured to run the computer program so as to execute the method according to claim 1.

12. The method according to claim 1, further comprising:
providing, by the policy server, a corresponding adjustment policy of an entire system according to a final processing result.

13. An system for inter-domain data interaction, comprising:
a management apparatus, configured to configure, in respective domains, one or more models in a model group;
a data collection apparatus, configured to encapsulate collected data in a designated message and send the designated message to a forwarder corresponding to a model, wherein the designated message carries indication information for indicating an address of the forwarder; and
the forwarder, configured to process the designated message after processing the collected data, and send the processed designated message to a next forwarder;
wherein the indication information further comprises: a number of models that have not completed data processing; and in response to the number of models that have not completed data processing being 0, the forwarder is further configured to: send the processed designated message to a policy server.

14. The system according to claim 13, wherein the management apparatus is configured to:
create management entries for the model group, wherein the management entries at least comprise: identifier information of the model group, model group information, address information of the data collection apparatus and address information of a policy server; and
configure, in respective designated domains, the one or more models according to the management entries.

15. The system according to claim 14, wherein the model group information at least comprises one of: identifier information of the one or more models, an arrangement order of the one or more models, information of one or more domains where the one or more models are located, and address information of one or more forwarders.

16. The system according to claim 14, wherein the data collection apparatus is configured to:
encapsulate the indication information in a message header of the designated message.

17. The system according to claim 16, wherein the indication information further comprises at least one of:
- identifier information of the model group; and
- metadata, wherein the metadata is used to indicate custom fields for inter-model interaction.

18. A non-transitory computer-readable storage medium in which a computer program is stored, wherein the computer program is configured to execute, when running, the following operations:
- configuring, in respective domains by a management apparatus, one or more models in a model group;
- encapsulating, by a data collection apparatus, collected data in a designated message, and sending, by the data collection apparatus, the designated message to a forwarder corresponding to a model, wherein the designated message carries indication information for indicating an address of the forwarder; and
- after processing the collected data, processing, by the forwarder, the designated message, and sending, by the forwarder, the processed designated message to a next forwarder;
- wherein the indication information further comprises: a number of models that have not completed data processing; and the computer program is configured to execute, when running, the following operations in response to the number of models that have not completed data processing being 0: sending, by the forwarder, the processed designated message to a policy server.

* * * * *